Sept. 13, 1949.  W. T. WHITE  2,481,550
SERVOMOTOR ARMATURE CURRENT CONTROL
Filed June 15, 1946
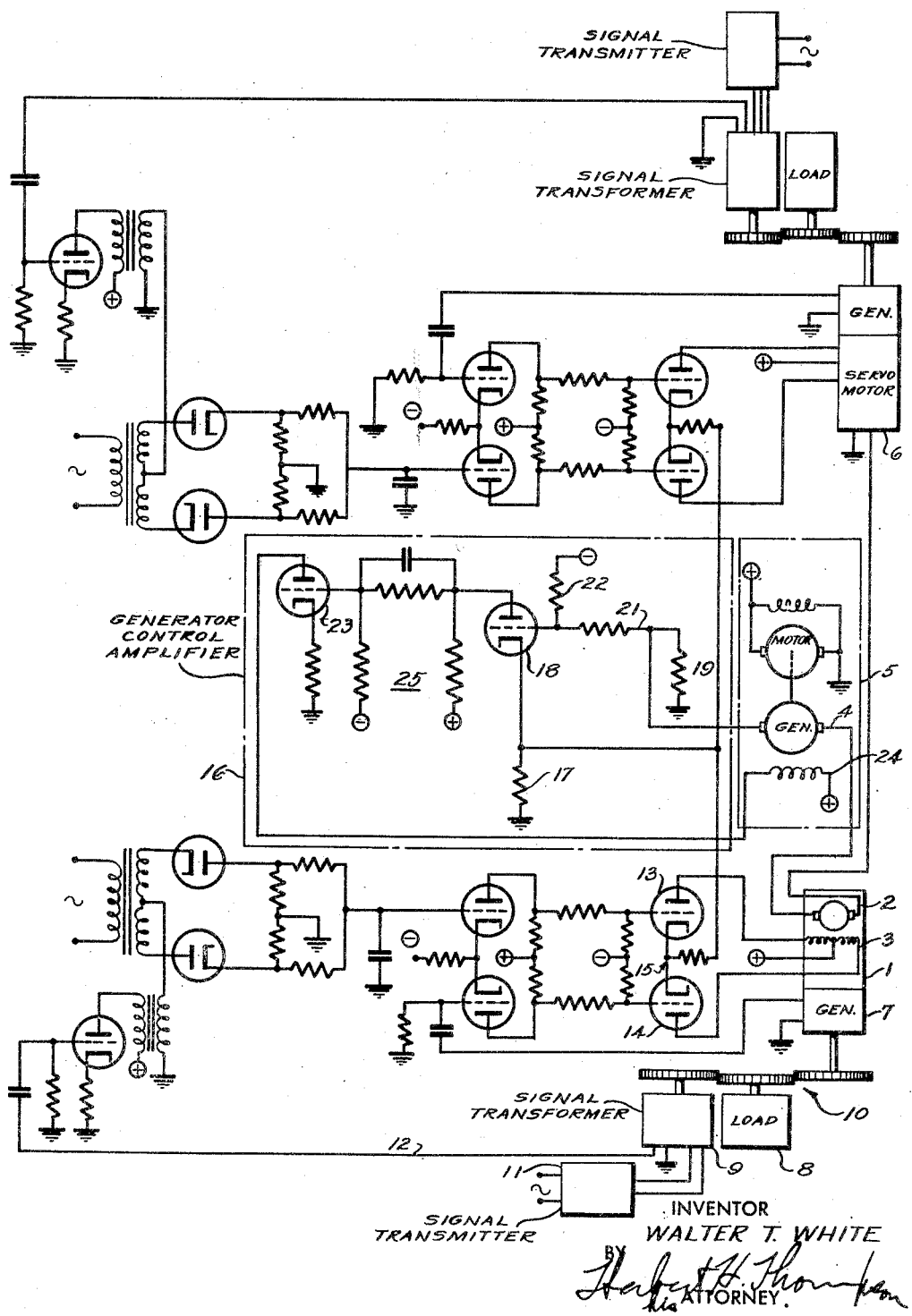
INVENTOR
WALTER T. WHITE
BY
Herbert H. Thompson
his ATTORNEY.

Patented Sept. 13, 1949

2,481,550

UNITED STATES PATENT OFFICE 2,481,550

SERVOMOTOR ARMATURE CURRENT CONTROL

Walter T. White, New Hyde Park, N. Y., assignor to The Sperry Corporation, a corporation of Delaware Application June 15, 1946, Serial No. 676,899

15 Claims. (Cl. 318—30)

This invention relates to servo-motor systems and more particularly to servo-motor armature current control systems.

In accordance with my invention, a servo-motor system is provided, comprising a servo-motor having field and armature windings, a motor driven generator including field windings and a source of current for exciting the same. The output of said generator is connected to the armature of said servo-motor and means are provided for supplying a primary control, or error voltage, to the field windings of said servo-motor to control the direction and rate of operation thereof. Also provided are means for varying the excitation of said generator field windings to compensate for load variations on the servo-motor.

In the conventional servo-motor system, the servo-motor armature receives its power from the output of a motor driven generator and control of the excitation of the separate field of the servo-motor serves to control the direction of the servo-motor rotation and its rate of operation. It is customary to excite the field of the servo-motor from the output of an amplifier which is controlled by an error signal voltage that has a magnitude and polarity or phase sense, depending on the actuation of a controller, if in a manual control system, or upon the amount and direction of disagreement between a reference and a follow-up element, if in an automatic system. In an automatic follow-up system, or positional control system, changes in load on the servo-motor will be reflected in corresponding changes in the lag with which the follow-up follows the reference element in the absence of means for compensating for such load variations. My invention includes means for compensating for load variations to maintain minimum lag in the servo-loop under changing load conditions while maintaining substantially uniform stability under all such load conditions. More particularly, my invention provides means whereby the excitation of the field of a motor-driven generator is made to increase with servo-motor load, thereby producing a larger generator output and enabling the servo-motor to develop the necessary torque that may be required to drive the load at a rate proportional to a given error signal voltage.

My invention finds particular application in systems wherein the generator supplies a plurality of servo-motors acting on loads that are independent of each other and which motors are independently controlled. I propose to connect the several servo-motor armatures in series with the output of a single generator and to control the excitation of the generator field in accordance with a measure of individual servo-motor loads, so that any one servo-motor experiencing an increased load requiring a higher torque output will be supplied with the torque-producing armature current that its particular load requires while the operation of the remaining servo-motors is not materially affected thereby. Consequently, the servo system, as set forth in this invention, is particularly adapted for use in apparatus wherein a plurality of servo-motors are provided to operate a plurality of independent and variable loads.

However, many advantages may also be derived from adaptations of my invention in apparatus providing a single servo-motor, and particularly where the single servo-motor is subjected to relatively large load variations in which event an adequate supply of torque-producing armature current becomes a prime necessity.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

An example of one use of my invention may be found in an aircraft machine gun turret wherein one servo-motor may be used to elevate the machine guns, and a second servo-motor is used to move the turret in azimuth. The load on each servo-motor is an independent variable, being affected by wind pressure on the protruding machine gun barrels, and the like.

The drawing illustrates an embodiment of my invention as adapted for use with two servo-motors, each acting on independent and variable loads, which adaptation would be similar to an arrangement as might appear in the above-mentioned turret.

Referring now to the drawing, servo-motor 1 has an armature 2 and a separate field 3. The armature 2 has one side connected to the output of a motor driven generator 5, while the other side is connected in series with an armature of a second servo-motor 6. Integral with the servo-motor 1 is a permanent magnet generator 7, the output serving to stabilize the servo-motor 1 through feedback into the amplifier. When a load 8 is placed on the servo-motor 1, (as through gear train 10 interconnecting the output from generator 7 with the load 8 and signal transformer 9) the signal transformer 9 will become unbalanced with respect to the signal transmitter 11. It is to be noted that the signal transmitter 11 and the signal transformer 9 may consist of any of several well-known devices such as rotatable transformers, or units of a self-synchronous system, wherein disagreement from a preselected equilibrium acts to cause an error signal to be emitted from the signal transformer 9.

Thus, when the load 8 causes an unbalance between the signal transformer 9 and the signal transmitter 11, an error signal is transmitted along conductor 12 through a phase sensitive detector wherein suitable amplification means, ending in tubes 13 and 14, produces a current with characteristics reflecting the action of the load on the original error signal. While each of these tubes produces a current output, the sum of currents produced is greater during a load condition than is the sum during a normal quiescent period. Further, this current will be larger in one tube, depending on the direction and the rate with which the servo-motor is to rotate to overcome the condition imposed by load 8. In this fashion, the servo-motor field 3 is excited with appropriate current from tubes 13 and 14, causing the servo-motor to rotate in the desired direction and an output current appears at junction 15 that will vary with the load applied to the servo-motor.

To make this load-responsive output current of the error signal amplifier increase the generator output, a generator control amplifier 16 is provided. In this generator control amplifier, a resistor 17 is connected between the cathode of tube 18 and ground. It is to the cathode side of this resistor 17, that the output from the error signal amplifier is applied. In this fashion, as the error signal amplifier output increases with an increase of servo-motor load, as hereinbefore described, the voltage drop across resistor 17 will increase and the potential of the cathode of tube 18 will be raised.

Turning now to the generator armature 4, the positive side of this armature is connected to resistor 19 and then to ground; through resistor 21 to the grid of the tube 18; and through resistor 22 to a source of negative potential bias. The result of this combination of resistors 19, 21 and 22 is to produce a grid potential bordering on zero value during a quiescent period. When a load is applied to the servo-motor while it is rotating, the differential current in field 3 is increased, and the sum of currents produced by tubes 13 and 14 is increased. The increased differential field-current and the servo-motor rotation cause an increase in the counter-electromotive force of the motor armature, and a consequent decrease in the armature current of generator 4. This decreased armature current in resistor 19 causes the grid of tube 18 to go negative with respect to the cathode. Also the increase in the sum of the differential currents of tubes 13 and 14 causes an increased voltage drop across resistor 17, with the result that the grid of tube 18 goes more negative relative to the cathode. This decrease of the grid potential of tube 18 causes tube 23 to produce an increased current which causes a greater field excitation of generator 4, and a resultant increase in the generator output and the torque producing current in armature 2 of servo-motor 1. It is in this fashion that means are provided whereby servo-motor armature current is made a function of servo-motor load.

Considering the effect on the second servo-motor 6 of this increase in generator output, as the servo-motor armatures are connected in series with this generator output, the current in the armature of servo-motor 6 will experience the same current increase that the armature of servo-motor 2 experienced. However, there are three factors present which will minimize the effect of this current in servo-motor 6. The first factor is the creation of a counter electromotive force in the armature of servo-motor 1, caused by the increase of load. The second factor is based on the incorporation of the permanent magnet generators, with feedback to the amplifier circuit, wherein any transient tendency for the servo-motor to oscillate is largely dissipated. The third factor serves to reduce any possible action, as a tendency for the servo-motor 6 to rotate will immediately be counteracted by its follow-up system. Any rotation of servo-motor 6 would produce a disagreement in its own follow-up system, thereby producing a counteracting torque which would serve to erase this disagreement.

In this drawing, a rate network 25 has been incorporated to overcome any delay that might result from inductance in the generator field and armature circuits.

In some applications of this invention, it may become necessary to incorporate additional circuits supplying inverse feedback in order to prevent drift of the control generator amplifier. As such circuits are well known to the art, they need not be set forth herein.

In the system herein described, a motor generator was provided with a separate field and means were provided for exciting same to produce an increase in armature output. The scope of this invention should not be limited thereto, as anyone well versed in the art could, utilizing the concepts described herein, produce similar results though employing many minor variations thereof. Thus, systems producing substantially what is described herein may be evolved through the use of a compound generator, or a series generator or many other well-known types.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A servo-motor armature current control system comprising servo motor with separate armature and differentially controllable field, a field controlled generator powering said servo-motor armature, means producing a voltage varying with load on said servo-motor, means supplying said load responsive voltage differentially to said controllable field, and an electronic control means active on said control generator responsive to the voltage produced in said first mentioned means thereby controlling generator output in response to servo-motor load variations.

2. A servo-motor armature current control system comprising a field controlled servo-motor with separate armature, a field controlled generator powering said servo-motor armature, an error signal transmitter effecting a signal indicative of servo-motor load condition and connected to control said servo-motor field, means producing a voltage varying with servo-motor load as indicated by said error signal transmitter, and an electronic control means active on the field of said control generator and responsive to the voltage produced in said first mentioned means thereby controlling generator output in response to servo motor load variations.

3. A servo-motor armature current control system comprising a field controlled servo-motor with separate armature, a field controlled generator powering said servo-motor armature, a source producing an error signal connected to excite said servo-motor field, means producing an output varying with servo-motor load as indicated by said error signal source, and an electronic control means active on said control generator and responsive to the output produced in said first means thereby controlling generator power output in response to servo motor load variations.

4. A servo-motor armature current control system comprising a plurality of field controlled servo-motors with their separate armatures connected in series and having differentially controllable fields, a field controlled generator powering said servo-motor armatures, means producing a voltage varying with the load on said servo-motors, circuit means differentially applying said load responsive voltage to said servo-motor fields, and an electronic control means active on said control generator responsive to the voltage produced in said first mentioned means thereby controlling generator output in response to load variations in said plurality of servo-motors.

5. In a servo-motor system, a servo-motor having field and armature windings, a motor driven generator including field windings and a source of current for exciting the same, the output voltage of said generator being connected to the armature of said servo-motor, means supplying a control voltage to the field windings of said servo-motor, and means varying said source of excitation of said generator field winding in accordance with load variations on said servo-motor.

6. In a servo-motor system, a servo-motor having field and armature windings, a motor driven generator including field windings and a source for exciting the same, the output of said generator serving to power said servo-motor armature, a source producing an error signal indicative of servo-motor load, means establishing a control voltage derived from said error signal and connected to excite the field winding of said servo-motor, and means varying said source of excitation of said generator field winding in accordance with load variations on said servo-motor as indicated by said error signal source.

7. In a servo-motor system, a plurality of servo-motors having field windings and with their several armatures connected in series, a motor driven generator including a field winding and a source of current for exciting the same, the output of said generator being connected to the armatures of said several servo-motors, separate means for supplying a control voltage to each field winding of said servo-motors, and means varying said source of excitation of said generator field winding in accordance with load variations on said servo-motors.

8. In a servo-motor armature current control system, a servo motor with separately excited field, an error signal transmitter and a phase-sensitive detector for receiving the error signals and supplying a voltage to said separately excited servo-motor field, a control generator supplying armature current for said servo-motor, a separately excited field for said control generator, electronic control means for controlling the generator field, means for deriving from said error-signal a voltage varying with the load on said servo-motor, said latter means supplying said voltage to the generator electronic control means thereby causing the output of the control generator to vary with servo-motor load.

9. In a servo-motor armature current control system, a servo motor with separately excited field, a source creating an error signal reflecting servo-motor load, an error signal amplifier and phase sensitive detector supplying an output signal activating said servo-motor field, a control generator supplying armature current for said servo-motor armature, a separately excited field for said control generator, electronic control means controlling excitation of the generator field, means deriving a voltage from the output signal of said error signal amplifier to correspond to servo-motor load, said latter means supplying said voltage to the electronic control means thereby causing the control generator output to vary with servo-motor load.

10. In a servo-motor armature current control system, a plurality of servo-motors with separately excited fields and with their armatures connected in series, a plurality of error signal transmitters and phase sensitive detectors for each servo-motor to receive error signals and supply a voltage to its corresponding servo-motor field, a control generator supplying armature current for said servo-motors, a separately excited field for said control generator, electronic control means controlling the generator field, means for deriving from said error signal voltages varying with the load on said servo-motors, said latter means supplying said voltages to the generator electronic control means thereby causing the output of the control generator to vary with the load on said servo-motors.

11. A servo-motor armature current-control system comprising, a servo-motor with separate field, a control generator with separate field, a source producing an error signal connected to excite said servo-motor field, and a generator control amplifier connected to the field of said generator, means producing a voltage varying with changes in servo-motor load, and means for applying said voltage in controlling output of said generator control amplifier whereby the separate field of said control generator produces an increase in the power supplied to said servo-motor armature corresponding to an increase in servo-motor load.

12. In a servo-motor system, a generator, a servo-motor having field windings and an armature, said armature being excited by said generator, a source of control signal voltage, an amplifier having its input connected to said signal source and its output connected to supply exciting current to said motor field windings, control means for controlling the voltage output of said generator, and means for supplying an output voltage varying in magnitude with changes in load on said servo-motor, said latter output being connected to said control means to cause increase in power output of said generator with increased load on said motor.

13. A servo-motor having a separate field system comprising a servo-motor, a control generator powering said servo-motor, means producing a voltage varying with a load on said servo-motor, means applying said load responsive voltage to energize said separate servo-motor field and an electronic control means active on said control generator responsive to the voltage produced in said first means thereby controlling the generator output in response to servo-motor load variations.

14. A servo-motor having a separate field system comprising a servo-motor, a control generator powering said servo-motor, an error signal transmitter effecting a signal for servo-motor control purposes and indicative of servo-motor load, means connecting said load responsive signal to energize said separate field, means producing a voltage varying with servo-motor load as indicated by said error signal transmitter, and control means active on said control generator and responsive to the voltage produced in said first means thereby controlling generator output in response to servo-motor load variations.

15. A servo-motor system comprising a plurality of servo motors each having a separate field, a control generator powering said servo motors, means producing a voltage varying with the load on said servo motors, means connecting said load responsive voltage to energize each of said separate fields and control means active on said control generator responsive to the voltage produced in said first mentioned means thereby controlling generator output in response to load variations in said plurality of servo-motors.

WALTER T. WHITE.

REFERENCES CITED

The following references are of record in the file of this patent:

UNITED STATES PATENTS

| Number | Name | Date |
|---|---|---|
| 2,119,715 | Miner | June 7, 1938 |
| 2,286,370 | Miller | June 16, 1942 |
| 2,424,809 | Edwards | July 29, 1947 |

FOREIGN PATENTS

| Number | Country | Date |
|---|---|---|
| 466,226 | France | May 7, 1914 |